United States Patent
Konoshima et al.

(10) Patent No.: US 10,635,991 B2
(45) Date of Patent: Apr. 28, 2020

(54) LEARNING METHOD, INFORMATION PROCESSING DEVICE, AND RECORDING MEDIUM

(71) Applicant: FUJITSU LIMITED, Kawasaki-shi, Kanagawa (JP)

(72) Inventors: Makiko Konoshima, Kawasaki (JP); Yui Noma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 950 days.

(21) Appl. No.: 14/809,809

(22) Filed: Jul. 27, 2015

(65) Prior Publication Data
US 2015/0332172 A1     Nov. 19, 2015

Related U.S. Application Data

(63) Continuation of application No. PCT/JP2013/052408, filed on Feb. 1, 2013.

(51) Int. Cl.
*G06N 20/00* (2019.01)
*G06F 17/16* (2006.01)
*G06K 9/62* (2006.01)

(52) U.S. Cl.
CPC ............. *G06N 20/00* (2019.01); *G06F 17/16* (2013.01); *G06K 9/6269* (2013.01); *G06K 9/6276* (2013.01)

(58) Field of Classification Search
CPC ...... G06N 99/005; G06N 20/00; G06N 20/10; G06F 17/16; G06K 9/6269; G06K 9/6276
See application file for complete search history.

(56) References Cited

U.S. PATENT DOCUMENTS

| | | | |
|---|---|---|---|
| 6,842,751 B1 * | 1/2005 | Vilalta | |
| 2003/0200188 A1 | 10/2003 | Moghaddam | |
| 2007/0203940 A1 * | 8/2007 | Wang | G06F 16/951 |

FOREIGN PATENT DOCUMENTS

| | | |
|---|---|---|
| EP | 2525306 A1 | 11/2012 |
| JP | 2006-252333 | 9/2006 |
| JP | 2007-004458 | 1/2007 |

(Continued)

OTHER PUBLICATIONS

Li, Yun, and Bao-Liang Lu. "Feature selection based on loss-margin of nearest neighbor classification." Pattern Recognition 42.9 (2009): 1914-1921.*

(Continued)

*Primary Examiner* — Eric Nilsson
(74) *Attorney, Agent, or Firm* — Fujitsu Patent Center

(57) ABSTRACT

A learning method includes: randomly selecting one or more feature vectors from feature vectors for learning to form a sample set, by a processor; selecting, from the feature vectors for learning, one of feature vectors appended with a label different from a label appended to a feature vector included in the sample set as a reference vector, the selecting being carried out based on a generalized average of distance from a feature vector included in the sample set, by the processor; and learning a hyperplane that divides a feature vector space, the learning being carried out using a pair of one of feature vectors appended with a label different from a label appended to the reference vector, among the feature vectors for learning, and the selected reference vector, by the processor.

7 Claims, 11 Drawing Sheets

(56) References Cited

FOREIGN PATENT DOCUMENTS

JP 2010-061176 3/2010
JP 2011-221689 11/2011

OTHER PUBLICATIONS

Kong, Xiangnan, and S. Yu Philip. "gMLC: a multi-label feature selection framework for graph classification." Knowledge and Information Systems 31.2 (2012): 281-305. (Year: 2012).*
Extended European Search Report dated Apr. 21, 2017 for corresponding European Patent Application No. 13873918.0, 9 pages. *Please note reference D1, Makiko Konoshima et al., "Locality-Sensitive Hashing with Margin Based Feature Selection" cited herewith, was previously cited in an IDS filed on Jul. 27, 2015.*.
Fan, Xiaohong et al., "A Maximum Class Distance Robust Support Vector Machine Classification Algorithm," Intelligent Systems, 2009. GCIS '09, WRI Global Congress on, IEEE, Piscataway, NJ, USA, May 19, 2009, pp. 476-480, XP031515997.
Li, Yun et al., "Feature selection based on loss-margin of nearest neighbor classification," Pattern Recognition, GB, vol. 42, No. 9, Sep. 1, 2009, pp. 1914-1921, XP026148579.

European Office Action dated Jun. 26, 2018 for corresponding European Patent Application No. 13873918.0, 6 pages. Please note reference D1, Makiko Konoshima et al., "Locality-Sensitive Hashing with Margin Based Feature Selection" cited herewith, was previously cited in an IDS filed on Jul. 27, 2015.*.
Mayur Datar, et al., "Locality-Sensitive Hashing Scheme Based on p-Stable Distributions", SCG 2004, Proceedings of the twentieth annual symposium on Computational geometry, pp. 253-262 (10 pages), Jun. 9-11, 2004.
Mohammad Norouzi, et al., "Minimal Loss Hashing for Compact Binary Codes", Proceedings of the 28th International Conference on Machine Learning (8 pages), Jun. 28, 2011.
Ran Gillad-Bachrach, et al., "Margin Based Feature Selection—Theory and Algorithms", Proceedings of the 21st International Conference on Machine Learning (8 pages), Jul. 4, 2004.
Makiko Konoshima, "Locality-Sensitive Hashing With Margin Based Feature Selection", The Institute of Electronics, Information and Communication Engineers (IEICE Technical Report), vol. 112, No. 83, pp. 41-47 (9 pages), Jun. 19-20, 2012.
Makiko Konoshima, et al., "Locality-Sensitive Hashing With Margin Based Feature Selection", pp. 1-9 (10 pages), Oct. 11, 2012. Retrieved form the Internet on Mar. 5, 2013.
International Search Report, mailed in connection with PCT/JP/2013/052408 dated Mar. 19, 2013.

* cited by examiner

| DATA ID | FEATURE VECTOR | LABEL |
|---|---|---|
| 1 | a, b, c··· | A |
| 2 | d, e, f··· | B |
| ⋮ | ⋮ | ⋮ |

LEARNING METHOD, INFORMATION PROCESSING DEVICE, AND RECORDING MEDIUM

CROSS-REFERENCE TO RELATED APPLICATION

This application is a continuation application of International Application PCT/JP2013/052408, filed on Feb. 1, 2013, and designating the U.S., the entire contents of which are incorporated herein by reference.

FIELD

The present invention relates to a learning method, an information processing device, and a learning program.

BACKGROUND

In the field of searching for similar data using feature vectors representing the feature of data such as a fingerprint, an image, and sounds, related techniques that moderate stringency to speed up search processing are known. In one of such techniques, for example, feature vectors are converted into binary strings with keeping the distance between the feature vectors to calculate the Hamming distance between the binary strings so that calculation cost can be reduced.

As a technique to convert feature vectors into binary strings with keeping the distance between the feature vectors, the locally-sensitive-hashing (LSH) is known. For example, an information processing device determines a plurality of hyperplanes which divides a feature vector space and converts feature vectors into binary strings each indicating plus or minus of the inner product of the normal vector of each hyperplane and the feature vector. In other words, the information processing device divides the feature vector space into a plurality of regions using hyperplanes and converts feature vectors into binary strings indicating to which divided region does the feature vector exist.

When a label representing similarity among data, such as an ID for identifying an individual who registered the data, is appended to data, a hyperplane for classifying data by a label is preferably determined to simplify classification of a newly registered data. A technique is known that uses a pair of data appended with different labels to learn a set of hyperplanes that classify data by labels.

For example, an information processing device randomly selects one of feature vectors as a reference vector and then selects a feature vector having the highest similarity with the reference vector among feature vectors appended with a label different from the label appended to the reference vector. Then by learning a hyperplane that separates the selected two feature vectors, the information processing device determines a hyperplane near the boundary between data appended with different labels.

Non Patent Document 1: M. Datar, N. Immorlica, P. Indyk, V. S. Mirrokni: Locality-Sensitive Hashing Scheme Based on p-Stable Distributions, Proceedings of the twentieth annual symposium on Computational geometry (SCG 2004)

Non Patent Document 2: M. Norouzi and D. Fleet: Minimal Loss hashing for compact binary codes, Proceedings of the 28th International Conference on Machine Learning (ICML '11)

Non Patent Document 3: Ran Gilad-Bachrachy Amir Navotz Naftali Tishbyy: Margin Based Feature Selection—Theory and Algorithms (ICML 2004)

In the aforementioned technique of learning a hyperplane, a hyperplane that separates a randomly selected reference vector and a feature vector having the highest similarity with the reference vector among feature vectors appended with a label different from the label appended to the reference vector is learned. The technique is disadvantageous in that a hyperplane that comprehensively classifies feature vectors is not learned.

For example, a group composed of data having the same label as the reference vector is determined as a reference group. The information processing device learns a hyperplane that locally classifies the group, composed of data appended with a label different from that of data included in the reference group, adjacent to the reference set and the reference group. If there is other group composed of data appended with a label different from that of data included in the reference group, it is desirable to learn a hyperplane that separates the feature vector space more comprehensively to classify a larger number of groups.

SUMMARY

According to an aspect of the embodiments, a learning method includes: randomly selecting one or more feature vectors from feature vectors for learning to form a sample set, by a processor; selecting, from the feature vectors for learning, one of feature vectors appended with a label different from a label appended to a feature vector included in the sample set as a reference vector, the selecting being carried out based on a generalized average of distance from a feature vector included in the sample set, by the processor; and learning a hyperplane that divides a feature vector space, the learning being carried out using a pair of one of feature vectors appended with a label different from a label appended to the reference vector, among the feature vectors for learning, and the selected reference vector, by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A learning method, an information processing device, and a learning program according to the present invention will be described referring to the attached drawings.

First Exemplary Embodiment

Figure 1:
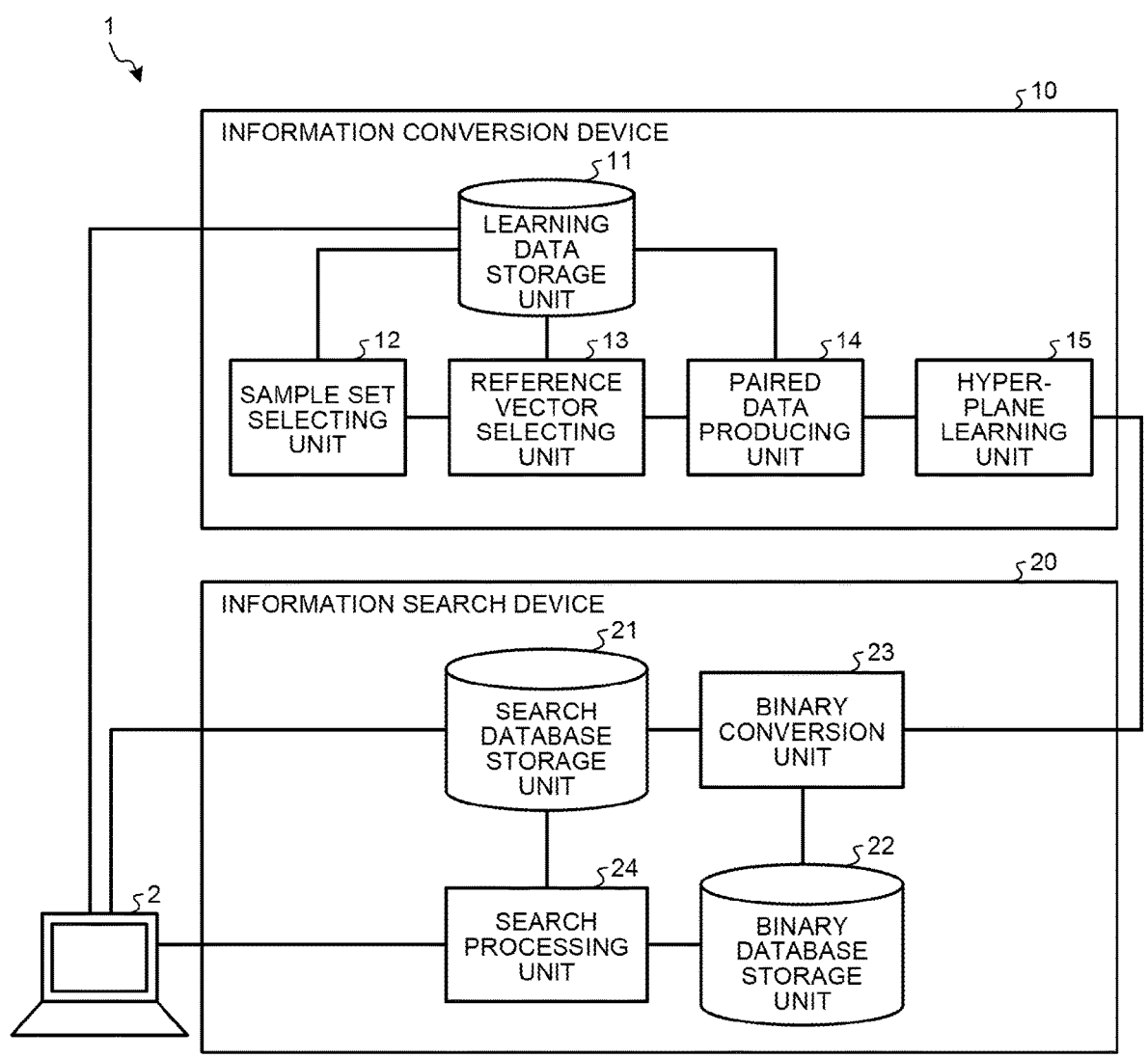
FIG. 1 illustrates a searching system according to a first exemplary embodiment.

An example searching system for executing the learning method will be described for a first exemplary embodiment using FIG. 1. FIG. 1 illustrates a searching system according to the first exemplary embodiment. As illustrated in FIG. 1, a searching system 1 includes a client device 2, an information conversion device 10, and an information search device 20.

The information conversion device 10 includes a learning data storage unit 11, a sample set selecting unit 12, a reference vector selecting unit 13, a paired data producing unit 14, and a hyperplane learning unit 15. The information search device 20 includes a search database storage unit 21, a binary conversion unit 23, a binary database storage unit 22, and a search processing unit 24.

Upon receiving query data from the client device 2, the searching system 1 illustrated in FIG. 1 searches for data near the query data in the search database storage unit 21. The searching system 1 notices the client device 2 of whether similar data is registered near the query data. Specifically, in the searching system 1, the information search device 20 uses a conversion matrix produced in the information conversion device 10 to convert the data to be searched for into a binary string and searches for data near the query data using the binary string obtained by the conversion.

The data to be searched for by the searching system 1 is, for example, image data, sound data, or biological data used for biometric identification, such as a fingerprint pattern or a vein pattern. That is, on receiving the query data which is biological data of a user input to the client device 2 the searching system 1 decides whether the biological data of the user is registered.

While various feature values of images and sounds are proposed, the searching system 1 is not dependent on a particular feature value, so that any feature value can be used. For a feature value of images for example, typically used SIFT feature value and SURF feature value can be used. These feature values are known to have robustness against hidden data and data changes when local information in an image is used as a feature vector. A feature vector of any type that represents a feature value can be used.

Figure 2:
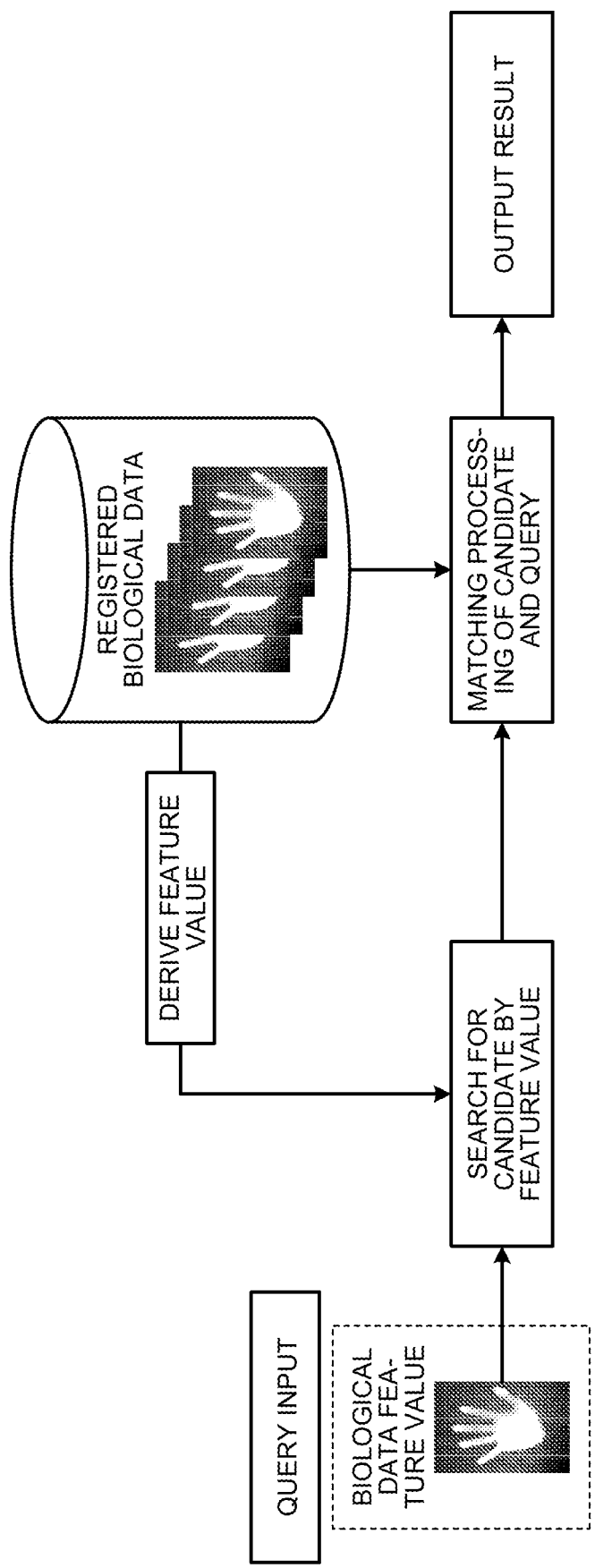
FIG. 2 illustrates an example biometric identification.

FIG. 2 illustrates an example biometric identification. FIG. 2 illustrates processing using ID-less 1:N identification which requests no input of user information such as identification (ID) and executes no searching of biological data using a user ID. As illustrated in FIG. 2, the searching system 1 stores a plurality of biological data registered by a plurality of users.

Upon receiving biological data as query data from the client device 2, the searching system 1 derives a feature vector representing the feature value of the input biological data and searches for a registered biological data having a feature vector similar to the derived feature vector. That is, the searching system 1 decides whether the biological data of a user who input the query data is registered.

The searching system 1 produces a conversion matrix for converting a feature vector into a binary string having a predetermined bit length and converts the feature vector of the registered biological data into a binary string using the produced conversion matrix. The searching system 1 converts the feature vector of the biological data input as query data into a binary string having a predetermined bit length and calculates the Hamming distance from the binary string obtained by converting the feature vector of the registered biological data.

The searching system 1 derives the registered biological data of which Hamming distance is smaller than or equal to a predetermined threshold as a candidate to be searched for. The information search device 1 then executes a precise matching processing for registered biological data that is searched for and the biological data input as query data and outputs the result to the client device 2.

For input biological data or registered biological data that is an image, the feature vector is a vector representing a value of, for example, dot-density or a coordinate that characterizes a particular region in the image, such as a direction or a length, inclination, and an end or a branch of a ridge. For an input biological data or registered biological data that is a sound, the feature vector is a vector representing a value of, for example, distribution, intensity, and a peak value of a frequency component.

Processing executed by the information conversion device 10 and processing executed by the information search device 20 will now be described. Referring back to FIG. 1, the information conversion device 10 produces by using learning data stored in the learning data storage unit 11 a conversion matrix for converting a feature vector into a binary string having a predetermined bit length and notices the information search device 20 of the produced conversion matrix.

The conversion matrix has a matrix row element which is the normal vector of a hyperplane dividing the feature vector space into a plurality of regions. The information search device 20 uses the conversion matrix to convert a feature vector into a binary string. For example, the information search device 20 calculates a product of the conversion matrix and the feature vector. Then the information search device 20 decides whether each element of the calculated product is positive or negative. If the element is a positive value, the information search device 20 produces a binary string of "1", and if the element is a negative value, the information search device 20 produces a binary string of "0". In other words, the information search device 20 uses the conversion matrix to convert a feature vector into a binary string that indicates to which region, among a plurality of regions in the feature vector space divided by hyperplanes, does each feature vector exist.

To simplify classification of newly registered data, a hyperplane which classifies data by a label is preferably determined. The information conversion device 10 produces a pair of positive examples, composed of feature vectors appended with the same label, and a pair of negative examples, composed of feature vectors appended with different labels, from feature vectors stored in the learning data storage unit 11. By using a pair of positive examples and a pair of negative examples that are produced, the information conversion device 10 simultaneously evaluates a plurality of determined hyperplanes to optimize the hyperplane.

Figure 3:
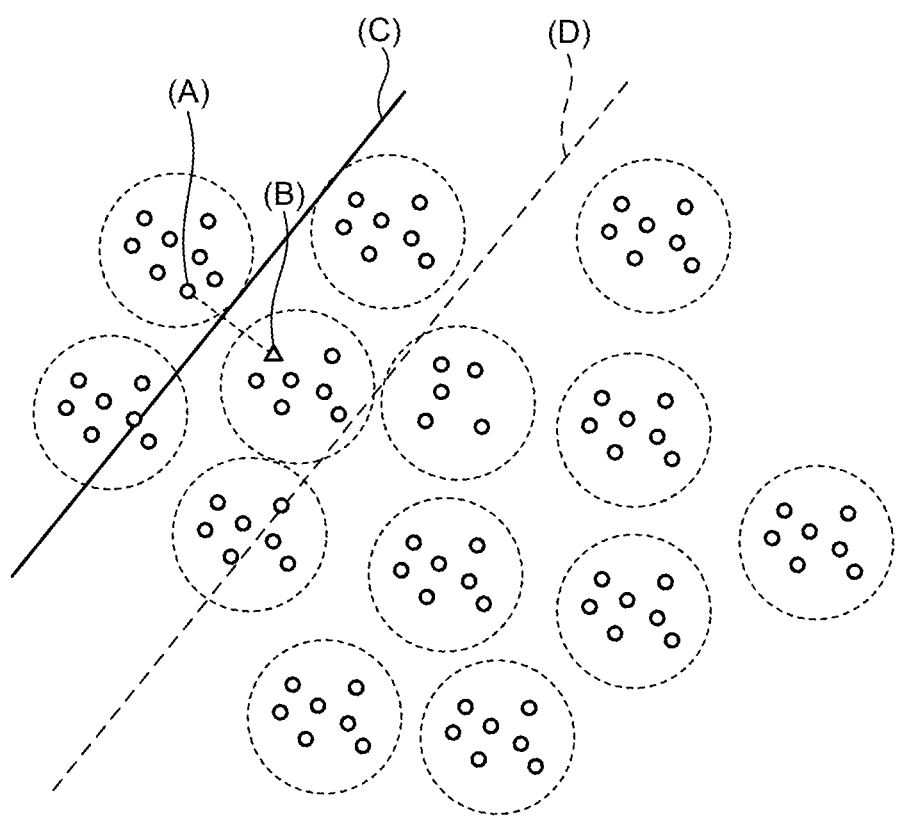
FIG. 3 is a figure explaining a comprehensive hyperplane.

If a plurality of types exists for labels appended to feature vectors, it is desirable to determine a comprehensive hyperplane which classifies a number of labels. For example, FIG. 3 is a figure explaining a comprehensive hyperplane. In the example illustrated in FIG. 3, a feature vector is indicated by a circle mark or a triangle mark, and each set of feature vectors appended with the same label, or a data set, is encircled with a dotted line.

For example, in a related technique, a hyperplane is learned using a pair of negative examples composed of the feature vector indicated by (A) in FIG. 3 and a feature vector, among feature vectors appended with a label different from that of (A) in FIG. 3, having the highest similarity with the feature vector indicated by (A) in FIG. 3, which is the feature vector indicated by (B) in FIG. 3. Consequently, in the related technique as indicated by (C) in FIG. 3, the hyperplane is determined near the boundary between the data set including feature vectors indicate by (A) in FIG. 3 and the data set including feature vectors indicate by (B) in FIG. 3.

If other set of data appended with a different label exists as illustrated in FIG. 3, it is desirable to determine a hyperplane that comprehensively classifies data as indicated by (D) in FIG. 3. Each bit of a binary string obtained by converting a feature vector represents to which side of the hyperplane does the feature vector exist. Thus if 100 data sets of which data appended with different labels exist, a hyperplane that comprehensively classifies data sets into 50 data sets and another 50 data sets is more useful than a hyperplane that classifies the data sets into one data set and the other 99 data sets.

The information conversion device 10 randomly selects a plurality of feature vectors to form a sample set from feature vectors stored in the learning data storage unit 11. The information conversion device 10 then identifies, from feature vectors stored in the learning data storage unit 11, the feature vector appended with a label different from that of feature vectors included in the sample set. The information conversion device 10 calculates the distance from the feature vector included in the sample set and calculates a generalized average with weighting of the calculated distances for each identified feature vector. The information conversion device 10 then identifies the feature vector having the smallest generalized average and determines the identified feature vector as a reference vector.

The information conversion device 10 selects a feature vector appended with a label different from that of the reference vector and produces a pair of negative examples composed of the selected feature vector and the reference vector. Then the information conversion device 10 learns a hyperplane using the produced pair of negative examples.

Figures 4, 5:
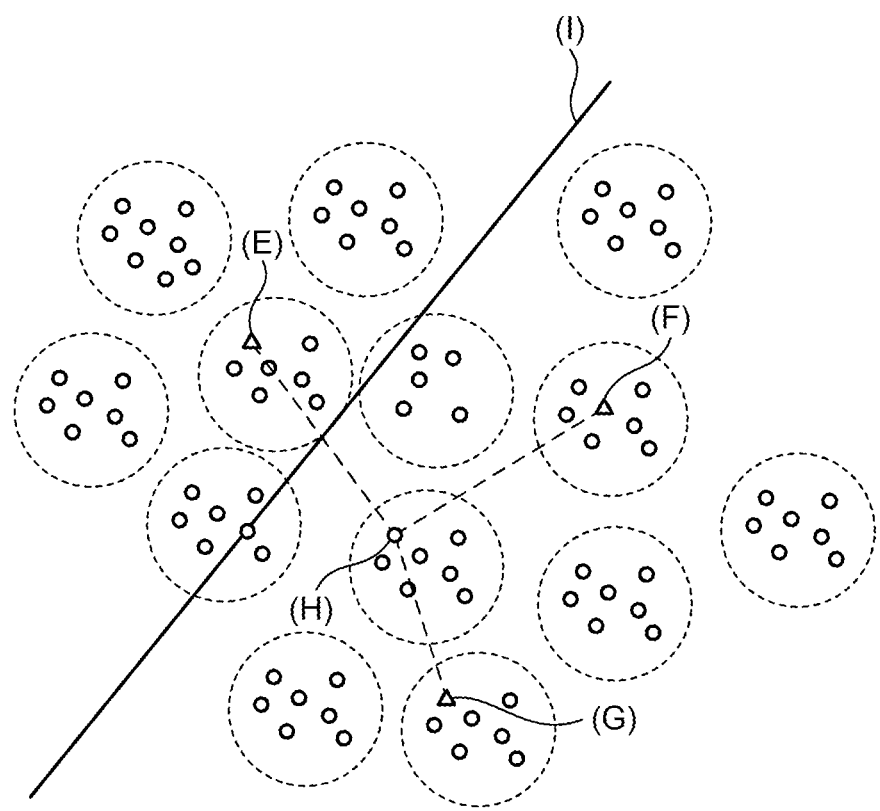
FIG. 4 is a figure explaining processing of determining a comprehensive hyperplane.
FIG. 5 illustrates an example data stored in a learning data storage unit.

An example processing executed by the information conversion device 10 will be described referring to FIG. 4. FIG. 4 is a figure explaining processing of determining a comprehensive hyperplane. For example, the information conversion device 10 selects feature vectors indicated by (E), (F), and (G) in FIG. 4 to form a sample set. The information conversion device 10 identifies every feature vector appended with a label different from any of those appended to the feature vectors indicated by (E), (F), and (G) in FIG. 4.

For each of the identified feature vectors, the information conversion device 10 calculates distances from (E), (F), and (G) in FIG. 4 and calculates the generalized average with weighting of the calculated distances. For example, using arbitrary real number m, the information conversion device 10 sums up m-th power of each distance, divides the resulting sum by n, which is the number of feature vectors included in the sample number, and calculates the m-th root of the divided result. The information conversion device 10 determines the feature vector that has the smallest calculated value of generalized average as the reference vector.

In the example illustrated in FIG. 4, the feature vector indicated by (H) in FIG. 4 is calculated to be the reference vector. Then the information conversion device 10 selects the reference vector indicated by (H) in FIG. 4 and the feature vector appended with a different label, for example the feature value indicated by (E) in FIG. 4, to compose a pair of negative examples. Although depending on weighting used in the calculation of generalized average, the reference vector determined closer to the gravity center of the whole feature vectors than the boundary line of the data set is likely to be selected by the information conversion device 10 using the sample set randomly selected from the whole feature vectors. Then by using the pair of negative examples including the reference vector, the information conversion device 10 can determine the hyperplane that can comprehensively classify data.

The information conversion device 10 can learn a hyperplane by using any method. For example, the information conversion device 10 may learn a hyperplane by optimizing a hyperplane so as to separate feature vectors included in a pair of negative examples instead of feature vectors included in a pair of positive examples.

Referring back to FIG. 1, processing executed by the learning data storage unit 11, the sample set selecting unit 12, the reference vector selecting unit 13, the paired data producing unit 14, and the hyperplane learning unit 15 included in the information conversion device 10 will now be described. The learning data storage unit 11 stores learning data used by the information conversion device 10 to learn a hyperplane.

Specifically, the learning data storage unit 11 stores a plurality of feature vectors as learning data for each user. Feature vectors stored in the learning data storage unit 11 are also included in the search database storage unit 21 which will be described later. That is, the learning data storage unit 11 stores a portion of feature vectors of registered biological data registered in the searching system 1.

FIG. 5 illustrates an example data stored in a learning data storage unit 11. As illustrated in FIG. 5, the learning data storage unit 11 stores a data ID (identification), a feature vector, and a label which are associated to one another. The data ID is a data identifier appended to each data. The label represents similarity of the feature vectors and also a user who registered data, such as biological data, which is represented by the feature vector.

In the example illustrated in FIG. 5 for example, the learning data storage unit 11 stores a feature vector which is indicated by data ID "1" and is floating-point data "a, b, c, ..." of 4000 dimensions appended with label "A". The learning data storage unit 11 stores a feature vector which is indicated by data ID "2" and is floating-point data "d, e, f, ..." of 4000 dimensions appended with label "B".

Referring back to FIG. 1, the sample set selecting unit 12 randomly selects a plurality of feature vectors from feature vectors stored in the learning data storage unit 11. The sample set selecting unit 12 determines a plurality of selected feature vectors to form a sample set, and notices the reference vector selecting unit 13 of the sample set. The sample set selecting unit 12 can select any number of feature vectors to form a sample set, although the number depends on the calculation amount allowed for the information conversion device 10 when learning a hyperplane.

On receiving the notice of the sample set from the sample set selecting unit 12, the reference vector selecting unit 13 identifies the label of the feature vector included in the received sample set. The reference vector selecting unit 13 then derives one of feature vectors stored in the learning data storage unit 11 appended with a label different from the identified label. The reference vector selecting unit 13 then executes processing described below for each derived feature vector.

The reference vector selecting unit 13 first calculates the distance between the derived feature vector and each feature vector included in the sample set. The reference vector selecting unit 13 calculates the generalized average of calculated distances. In the calculation of generalized average, the reference vector selecting unit 13 may optionally use weighting of distance.

The reference vector selecting unit 13 identifies the feature vector having the smallest calculated generalized average among derived feature vectors. The reference vector selecting unit 13 notices the paired data producing unit 14 of the identified feature vector as the reference vector. To simplify the producing of a pair of negative examples, the reference vector selecting unit 13 notices the paired data producing unit 14 of the feature vector included in the sample set.

On receiving the notice of the reference vector from the reference vector selecting unit 13, the paired data producing unit 14 produces a pair of negative examples including the received reference vector and notices the hyperplane learning unit 15 of the produced pair of negative examples. For example, the paired data producing unit 14 produces a pair of negative examples composed of the reference vector and the feature vector included in the sample set. The paired data producing unit 14 randomly selects the feature vector appended with the label same as that of the reference vector from the learning data storage unit 11 and produces a pair of positive examples composed of the selected feature vector and the reference vector. The paired data producing unit 14 notices the hyperplane learning unit 15 of a pair of positive examples and a pair of negative examples which are produced.

The paired data producing unit 14 may produce the pair of negative examples including the reference vector by any method. For example, the paired data producing unit 14 selects the nearest feature vector (the feature vector having the highest similarity) among feature vectors appended with a label different from that of the reference vector to produce a pair of negative examples including the selected feature vector and the reference vector.

The paired data producing unit 14 may randomly select a feature vector appended with a label different from that of the reference vector and produce a pair of negative examples including the selected feature vector and the reference vector. The paired data producing unit 14 may select a predetermined number of feature vectors according to weight used in calculation of generalized average of distances from feature vectors included in the sample set, where a feature vector applied with a larger weight is sequentially selected. The paired data producing unit 14 may produce a pair of negative examples composed of the selected feature vector and the reference vector.

The hyperplane learning unit 15 learns optimized hyperplane using a pair of positive examples and a pair of negative examples received from the paired data producing unit 14. For example, the hyperplane learning unit 15 receives a pair of positive examples and a pair of negative examples from the paired data producing unit 14. The hyperplane learning unit 15 determines the sum of the number of pairs of positive examples that are not separated to different regions by a randomly determined hyperplane and the number of pairs of negative examples separated to different regions by a hyperplane as an evaluation value.

The hyperplane learning unit 15 recalculates the evaluation value by a predetermined algorithm, for example, by randomly changing the location of a hyperplane. By repeating the processing a predetermined times, the hyperplane learning unit 15 selects the hyperplane with the highest evaluation value as the optimized hyperplane. Then the hyperplane learning unit 15 produces a matrix including the normal vector of the optimized hyperplane as a row vector, which is a conversion matrix, and notices the binary conversion unit 23 of the produced conversion matrix.

The processing executed by the information search device 20 will now be described. The search database storage unit 21 stores the data to be searched for, that is, the feature vector of registered biological data. Specifically, the search database storage unit 21 stores data similar to that stored in the learning data storage unit 11. The search database storage unit 21 may store a larger amount of data including the data stored in the learning data storage unit 11.

The binary database storage unit 22 associates and stores a binary string produced by converting a feature vector using a predetermined conversion matrix and a data ID of data which is converted.

Referring back to FIG. 1, when the binary conversion unit 23 receives the conversion matrix from the hyperplane learning unit 15 of the information conversion device 10, the binary conversion unit 23 converts the feature vector stored in the search database storage unit 21 into a binary string by using the received conversion matrix. The binary conversion unit 23 associates the binary string produced by the conversion and the data ID associated with the feature vector which is converted and contains the binary string in the binary database storage unit 22.

On receiving query data from the client device 2, the search processing unit 24 derives the feature vector representing the feature value of the received query data and converts the derived feature vector into a binary string using a predetermined conversion matrix. The search processing unit 24 searches for a binary string of which Hamming distance is smaller than or equal to a predetermined value, that is, the binary string of the feature vector likely to be near the query data, among binary strings stored in the binary database storage unit 22.

Then from the search database storage unit 21, the search processing unit 24 obtains the feature vector which is a vector converted into the binary string that is searched for. If a feature vector that is identical to the one derived from the query data or a feature vector of which Euclidean distance is smaller than or equal to a predetermined threshold is included in the obtained feature vectors, the search processing unit 24 executes the following processing. The search processing unit 24 sends a notice to the client device 2 that the query data is identical to the registered biological data.

Meanwhile, if the feature vector identical to the feature vector derived from the query data or the feature vector of which Euclidean distance is smaller than or equal to a predetermined threshold is not included in the obtained feature vectors, the search processing unit 24 executes the following processing. The search processing unit 24 sends a notice to the client device 2 that the query data is not identical to the registered biological data. In this manner, the client device 2 can perform biometric identification of the user who input the query data.

For example, the sample set selecting unit 12, the reference vector selecting unit 13, the paired data producing unit 14, and the hyperplane learning unit 15 are electronic circuits. As an electronic circuit, an integrated circuit, such as an application specific integrated circuit (ASIC) or a field programmable gate array (FPGA), a central processing unit (CPU), or a micro processing unit (MPU) is used.

The learning data storage unit 11, the search database storage unit 21, and the binary database storage unit 22 are each a semiconductor memory element, such as a random access memory (RAM) and a flash memory, or a storage device, such as a hard disk and an optical disk.

Figure 6:
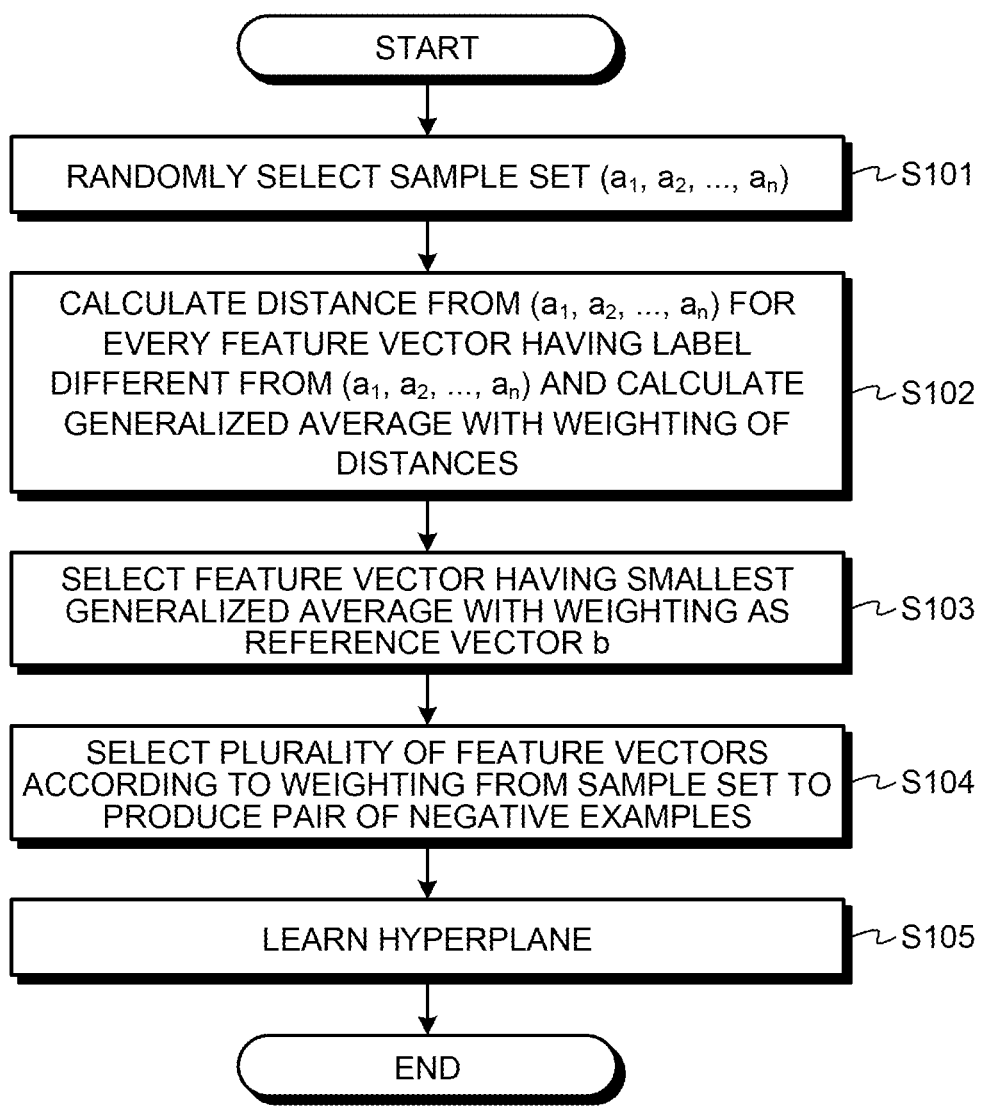
FIG. 6 is a flow chart of processing executed in an information conversion device.

A flow of processing executed by the information conversion device 10 will now be described referring to FIG. 6. FIG. 6 is a flow chart of processing executed in the information conversion device 10. In the example illustrated in FIG. 6, the information conversion device 10 selects n−1 of feature vectors $a_1$ to $a_n$ to form a sample set.

The information conversion device 10 randomly selects a sample set (a1, a2, . . . , an) (step S101). The information conversion device 10 calculates the distance from each feature vector included in the sample set (a1, a2, . . . , an) for every feature vector appended with a label different from those of the sample set (a1, a2, . . . , an).

The information conversion device 10 calculates a generalized average with weighting of calculated distances (step S102). The information conversion device 10 selects the feature vector having the smallest generalized average with weighting as the reference vector b (step S103). The information conversion device 10 selects a predetermined number of feature vectors from the sample set ($a_1$, $a_2$, . . . , $a_n$) based on weighting used in calculation of the distance from the sample set ($a_1$, $a_2$, . . . , $a_n$).

The information conversion device 10 produces a pair of negative examples composed of the selected feature vector and the reference vector (step S104). The information conversion device 10 then learns a hyperplane (step S105) and finishes the processing.

Effects of Information Conversion Device 10

As described above, the information conversion device 10 randomly selects a plurality of feature vectors in the learning data storage unit 11 to form a sample set. The information conversion device 10 selects the feature vector that is appended with a label different from a label of any of feature vectors included in the sample set and has the smallest generalized average distance from feature vectors included in the sample set as the reference vector. The information conversion device 10 learns a hyperplane using a pair of negative examples composed of the feature vector appended with a label different from that of the reference vector and the reference vector. Thus the information conversion device 10 can determine a hyperplane that comprehensively divides the feature vector space.

The information conversion device 10 learns a hyperplane using a pair of negative examples composed of the feature vector included in the sample set and the reference vector. Thus the information conversion device 10 can easily produce a pair of negative examples for learning a hyperplane that comprehensively divides the feature vector space.

The information conversion device 10 calculates the distance from each feature vector included in the sample set for every feature vector appended with a label different from a label of any of feature vectors included in the sample set. The information conversion device 10 calculates the generalized average with weighting of calculated distances for each feature vector. The information conversion device 10 determines the feature vector that has the smallest calculated generalized average with weighting as the reference vector. Thus the information conversion device 10 can determine a hyperplane at a location corresponding to the weighting used in calculation of generalized average.

Second Exemplary Embodiment

According to the present invention, various embodiments other than the exemplary embodiment described above can be carried out. Another exemplary embodiment included in the present invention will now be described as a second exemplary embodiment.

(1) Local Correction

The information conversion device 10 described above determines a hyperplane that comprehensively classifies data. Although, determination of a hyperplane carried out by an exemplary embodiment is not limited to this manner. For example, the information conversion device 10 may be configured to determine a hyperplane that comprehensively classifies data at a location near the boundary between data sets appended with different labels.

For example, the reference vector selecting unit 13 randomly selects one or more feature vectors from the whole feature vectors to form a sample set. The reference vector selecting unit 13 then selects the feature vector that is appended with a label different from a label of any of feature vectors included in the sample set and has the smallest generalized average with weighting as the reference vector. The reference vector selecting unit 13 notices the paired data producing unit 14 of the selected reference vector.

The reference vector selecting unit 13 may select one feature vector to form a sample set. In such a case, the reference vector selecting unit 13 selects the feature vector nearest to the feature vector that is appended with a label different from a label of the feature vector included in the sample set as the reference vector.

On receiving the notice of the reference vector, the paired data producing unit 14 searches for the nearest of feature vectors appended with a label different from that of the received reference vector. The paired data producing unit 14 produces a pair of negative examples composed of the found feature vector and the reference vector and notices the hyperplane learning unit 15 of the produced pair of negative examples. As a result, the information conversion device 10 can determine a hyperplane near the boundary between data sets that have different labels. The paired data producing unit 14 may select the feature vector nearest to the reference vector among feature vectors appended with the same label as the sample set to produce a pair of negative examples composed of the selected feature vector and the reference vector.

Figure 7:
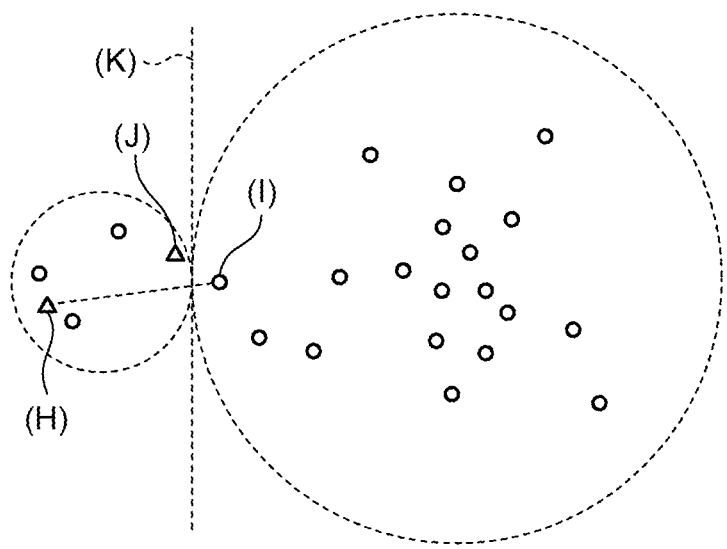
FIG. 7 is a first figure explaining a variation of producing a pair of negative examples.

FIG. 7 is a first figure explaining a variation of producing a pair of negative examples. In the example illustrated in FIG. 7, the feature vector is indicated by a circle mark or a triangle mark, and a data set appended with the same label is encircled with a dotted line. For example, the information conversion device 10 selects feature vectors indicated by (H) in FIG. 7 to form a sample set. Then the information conversion device 10 selects the nearest of feature vectors appended with a label different from that of the feature vector indicated by (H) in FIG. 7, that is, the feature vector indicated by (I) in FIG. 7, as the reference vector.

The information conversion device 10 selects the nearest of feature vectors appended with a label different from that of the feature vector indicated by (I) in FIG. 7, that is, the feature vector indicated by (J) in FIG. 7. Then the information conversion device 10 selects the feature vector indicated by (I) in FIG. 7 and the feature vector indicated by (J) in FIG. 7 to compose a pair of negative examples. As a result, the information conversion device 10 can set a hyperplane at the boundary between data sets appended with different labels as indicated by (K) in FIG. 7.

Figure 8:
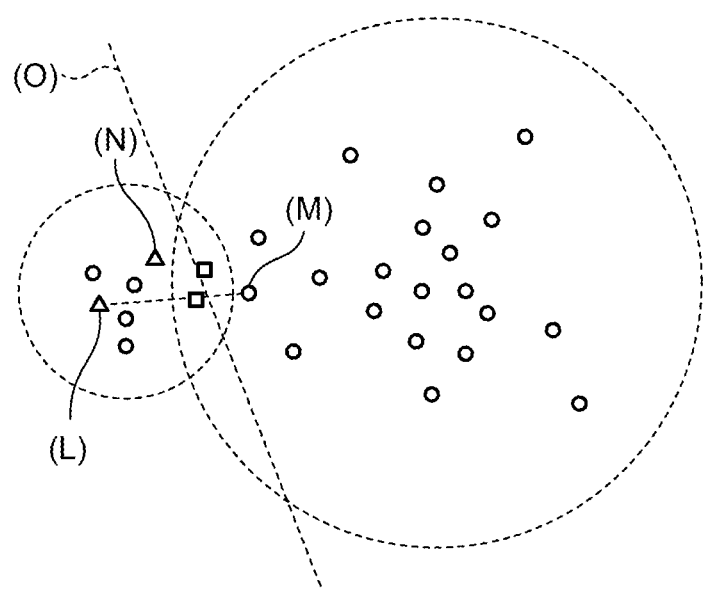
FIG. 8 is a second figure explaining a variation of producing a pair of negative examples.

The information conversion device 10 first selects a sample set randomly. Since the reference vector is likely to be determined near the gravity center of the whole feature vectors, the information conversion device 10 can determine a hyperplane that comprehensively divides feature vectors FIG. 8 is a second figure explaining a variation of producing a pair of negative examples. The feature vector indicated by a square mark in FIG. 8 is appended with both the label appended to the feature vector indicated by a triangle mark and the label appended to the feature vector indicated by a circle mark.

For example, the information conversion device 10 selects feature vectors indicated by (L) in FIG. 8 to form a sample set. Then the information conversion device 10 selects the nearest of feature vectors appended with a label different from that of the feature vector indicated by (L) in FIG. 8, that is, the feature vector indicated by (M) in FIG. 8 as the reference vector. The feature vector indicated by a square mark is appended with the same label as the feature vector indicated by (L) in FIG. 8 and thus is not selected as the reference vector.

Then the information conversion device 10 selects the nearest of feature vectors appended with a label different from that of the feature vector indicated by (M) in FIG. 8, that is, the feature vector indicated by (N) in FIG. 8. Then the information conversion device 10 selects the feature vector indicated by (M) in FIG. 8 and the feature vector indicated by (N) in FIG. 8 to compose a pair of negative examples. As a result, the information conversion device 10 can set a hyperplane at the boundary between data sets appended with different labels as indicated by (O) in FIG. 8.

Figure 9:
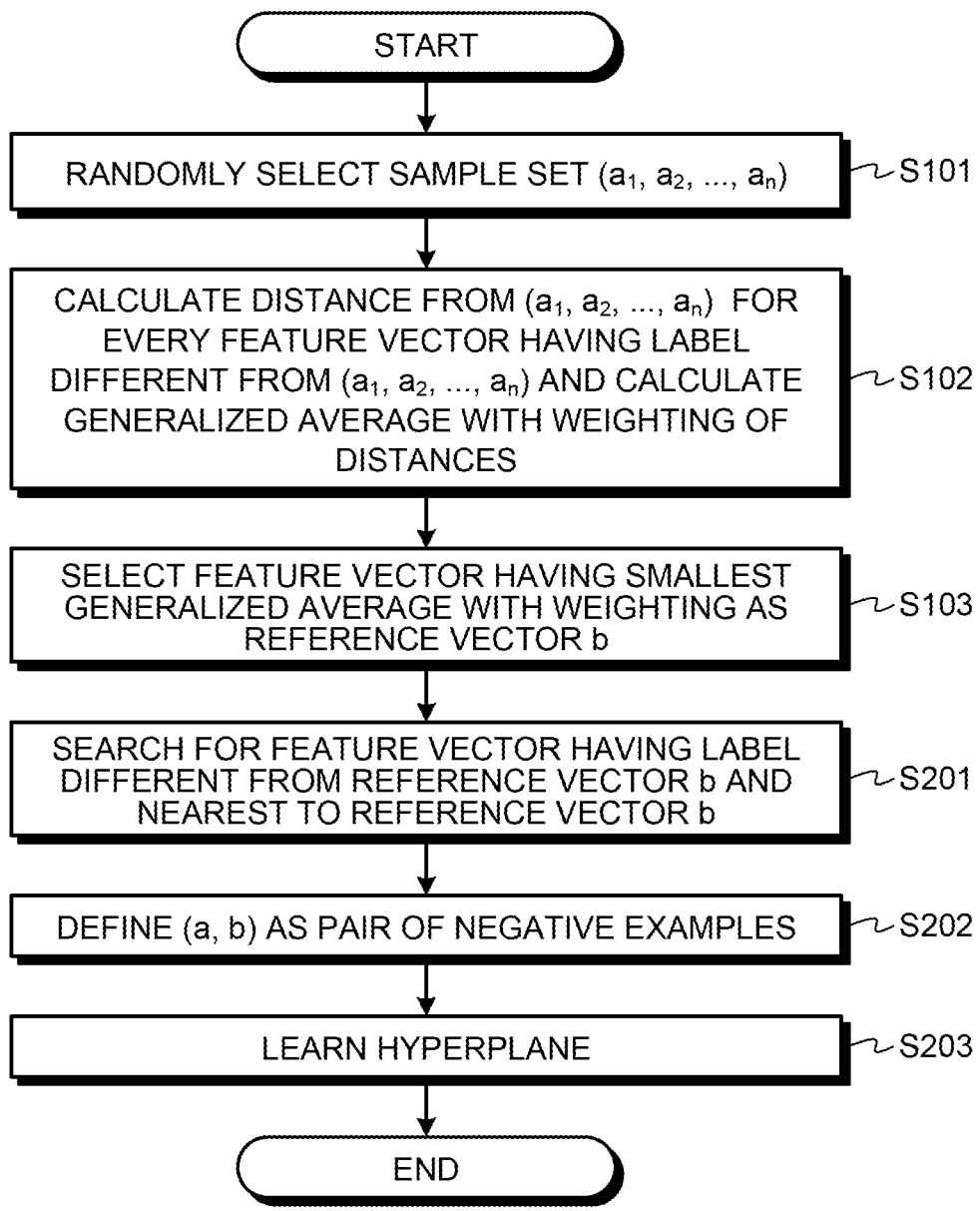
FIG. 9 is a flow chart of processing of determining a hyperplane near a boundary between data sets.

A flow of processing of determining a hyperplane near a boundary between data sets will be described using FIG. 9. FIG. 9 is a flow chart of the processing of determining a hyperplane near a boundary between data sets. In the example illustrated in FIG. 9, the information conversion device 10 selects n−1 of feature vectors $a_1$ to $a_n$ to form a sample set. Processing of steps S101 to S103 in FIG. 9 are the same as the processing of steps S101 to S103 in FIG. 6, so that the description thereof is omitted.

The information conversion device 10 searches for feature vector a, which is nearest to reference vector b among feature vectors appended with a label different from that of the reference vector b (step S201). The information conversion device 10 produces a pair of negative examples composed of the feature vector a and the reference vector b (Step S202), learns a hyperplane using the produced pair of negative examples (step S203), and finishes the processing.

As described above, the information conversion device 10 selects the feature vector that is appended with a label different from the label of randomly selected sample set and has the smallest generalized average distance from feature vectors included in the sample set as the reference vector. The information conversion device 10 learns a hyperplane using a pair of negative examples composed of the reference vector and one of feature vectors appended with a label different from that of the reference vector and having the shortest distance from the reference vector. Thus the information conversion device 10 can determine a hyperplane that comprehensively classifies data at the location near the boundary between data sets appended with different labels. That is, the information conversion device 10 can determine a hyperplane that is comprehensively and locally optimized.

(2) Selecting Reference Vector

The information conversion device 10 described above selects the feature vector that has the smallest generalized average with weighting of distances from feature vectors included in the sample set. This manner of selection is not always requested of the exemplary embodiment. For example, the information conversion device 10 may select the feature vector having the generalized average with weighting of a predetermined percentile as the reference vector. For example, the reference vector selecting unit 13 takes a distribution of feature vectors by the calculated generalized average with weighting in the ascending order and selects the feature vector that comes to a predetermined percentage as the reference vector.

Figure 10:
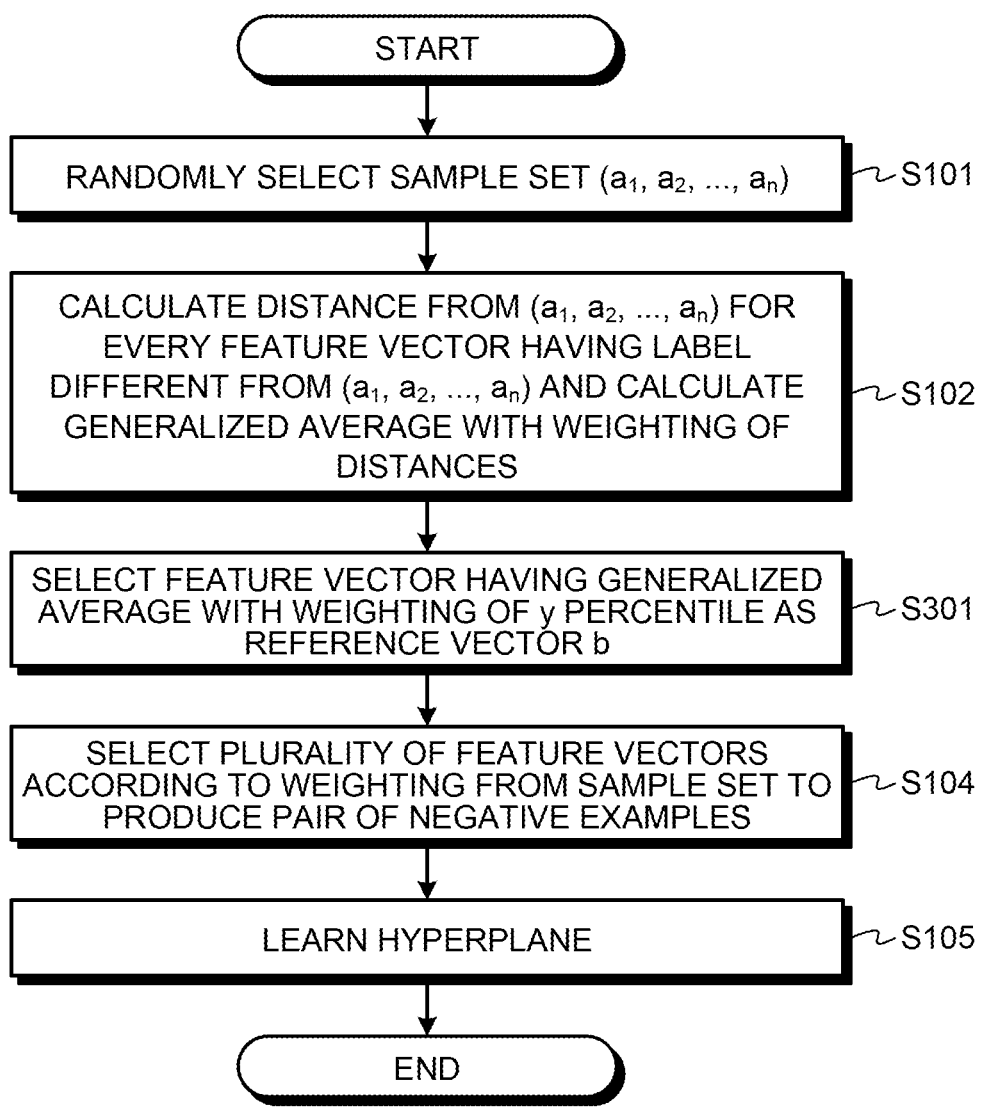
FIG. 10 is a first flow chart of a variation of the processing of determining a hyperplane.

Processing of selecting a reference vector according to percentile will now be described using FIG. 10. FIG. 10 is a first flow chart of a variation of the processing of determining a hyperplane. Processing of steps S101, S102, S104, and S105 in FIG. 9 are the same as the processing of steps S101, S102, S104, and S105 FIG. 6, so that the description thereof is omitted.

For example, the information conversion device 10 takes a distribution of feature vectors by the generalized average with weighting in the ascending order and selects the feature vector that comes to a percentage of y, that is, the feature vector of y percentile, as the reference vector b (step S301). The information conversion device 10 learns a hyperplane using a pair of negative examples including the selected reference vector.

As described above, the information conversion device 10 calculates the generalized average with weighting of the distance between each feature vector included in the sample set and the feature vector appended with a label different from that of the sample set. The information conversion device 10 determines the feature vector that has the calculated generalized average of a predetermined percentile as the reference vector. As a result, the information conversion device 10 can arbitrarily determine by what degree a hyperplane comprehensively divides the feature vector space.

(3) Candidates to be Selected as Reference Vector

The information conversion device 10 described above selects the reference vector from feature vectors appended with a label different from that appended to the feature vector included in the sample set. The candidates to be selected is not limited to such feature vectors in the exemplary embodiment. That is, the information conversion device 10 may select the reference vector from feature vectors other than that included in the sample set.

For example, the reference vector selecting unit 13 calculates the distance from each feature vector included in the sample set for every feature vector other than that included in the sample set. The reference vector selecting unit 13 calculates an arithmetic average with weighting of calculated distances considering the distance between feature vectors appended with the same label as a negative value. The reference vector selecting unit 13 may determine the feature vector that has the smallest calculated arithmetic average with weighting as the reference vector.

Figure 11:
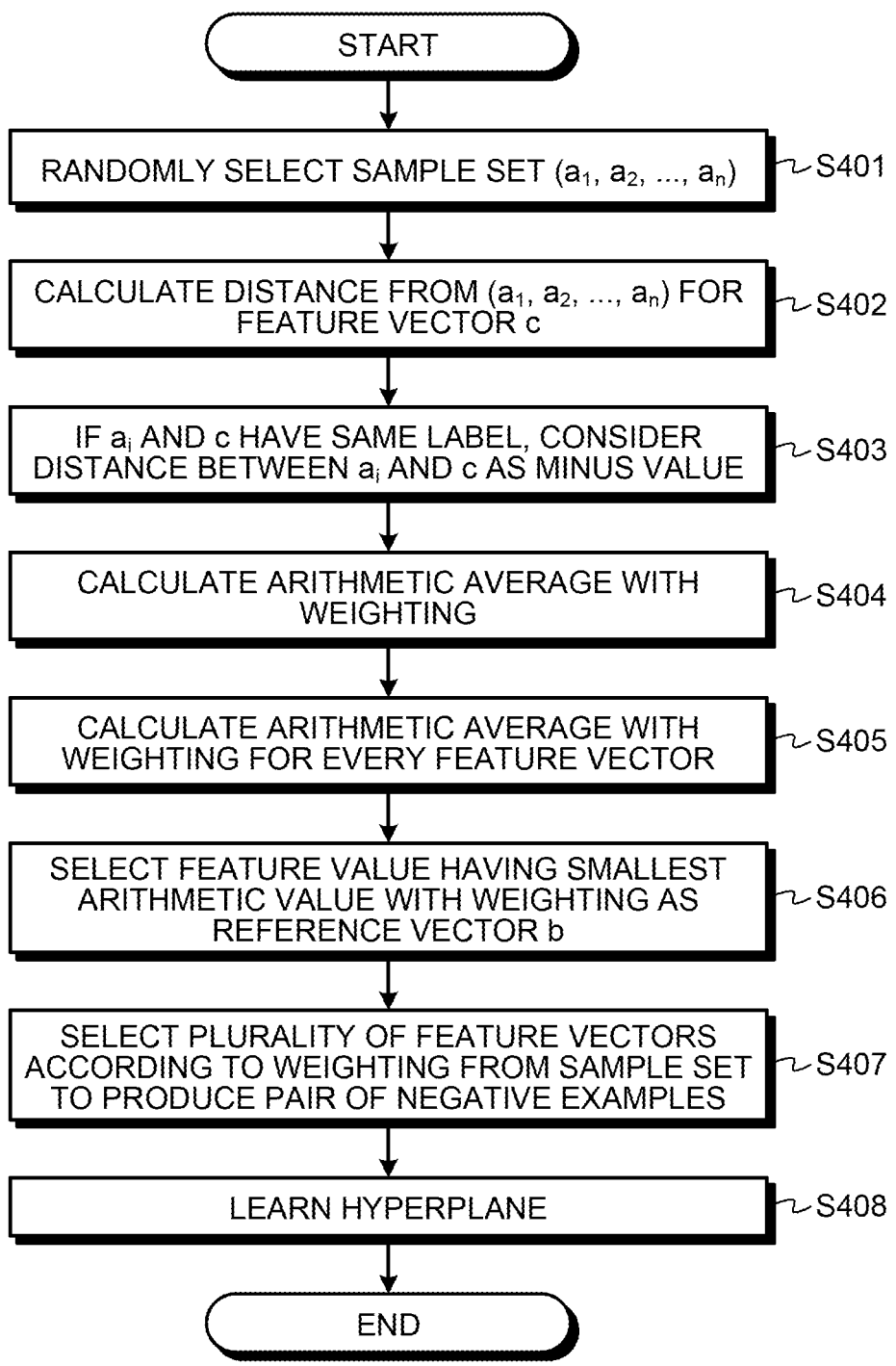
FIG. 11 is a second flow chart of a variation of the processing of determining a hyperplane.

A flow of processing of selecting a reference vector from feature vectors other than that included in the sample set will now be described using FIG. 11. FIG. 11 is a second flow chart of a variation of the processing of determining a hyperplane.

The information conversion device 10 randomly selects a sample set ($a_1$, $a_2$, $a_n$) (step S401). The information conversion device 10 calculates the distance from the sample set ($a_1$, $a_2$, . . . , $a_n$) for a feature vector c (step S402). If the same label is appended to the feature vector $a_i$ and the feature vector c, the information conversion device 10 determines the calculated distance between the feature vector $a_i$ and the feature vector c as a negative value (step S403). The information conversion device 10 calculates the arithmetic average with weighting (step S404).

The information conversion device 10 calculates the arithmetic average with weighting for every feature vector (step S405) and selects the reference vector b having the smallest calculated arithmetic average with weighting (step S406). The information conversion device 10 selects a predetermined number of feature vectors from the sample set (a1, a2, . . . , an) with reference to weighting used in calculation of distance from the sample set (a1, a2, . . . , an). The information conversion device 10 produces a pair of negative examples or a pair of positive examples composed of the selected feature vector and the reference vector (step S407). The information conversion device 10 then learns a hyperplane (step S408) and finishes the processing.

As described above, the information conversion device 10 calculates the distance from the feature vector included in the sample set for all of the feature vectors other than each feature vector included in the sample set. The information conversion device 10 calculates the arithmetic average with weighting considering the distance between feature vectors appended with the same label as a negative value. The information conversion device 10 selects the feature vector that has the smallest calculated arithmetic average as the reference vector. Thus the information conversion device 10 can also select a feature vector appended with the same label as the feature vector included in the sample set as the reference vector.

Figure 12:
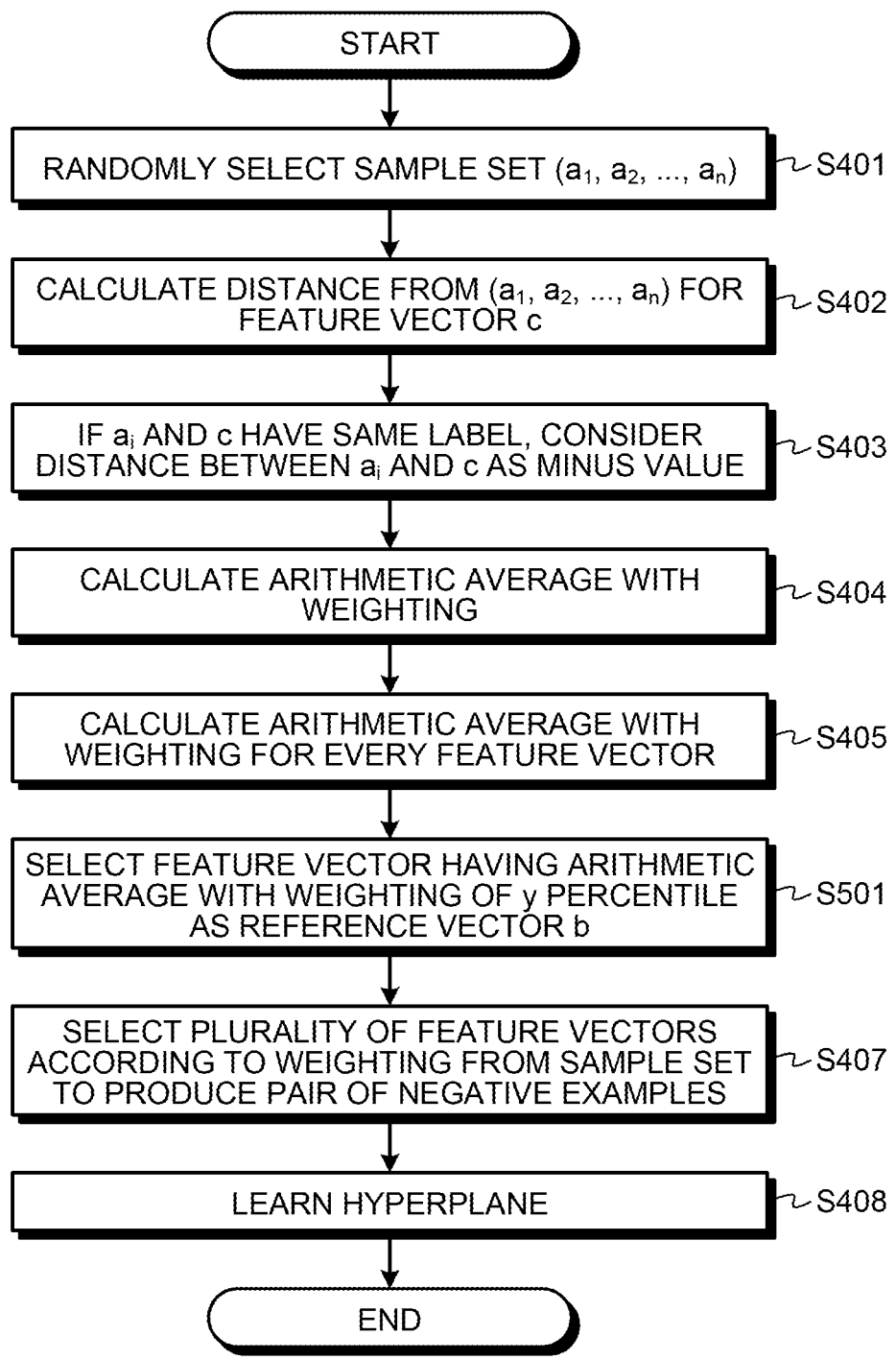
FIG. 12 is a third flow chart of a variation of the processing of determining a hyperplane.

The information conversion device 10 may select the feature vector having the arithmetic average of a predetermined percentile as the reference vector instead of the feature vector having the smallest calculated arithmetic average. For example, FIG. 12 is a third flow chart of a variation of the processing of determining a hyperplane. Processing of steps S401 to S405, S407, and S408 in FIG. 12 are the same as the processing of steps S401 to S405, S407, and S408 in FIG. 11, so that the description thereof is omitted.

For example, as illustrated in FIG. 12, the information conversion device 10 selects the feature vector having the calculated arithmetic average of y percentile as the reference vector b (step S501). As described above, the information conversion device 10 calculates the arithmetic average with weighting considering the distance between feature vectors appended with the same label as a negative value, and selects the feature vector having the calculated arithmetic average of a predetermined percentile as the reference vector. Thus, the information conversion device 10 can arbitrarily determine by what degree a hyperplane comprehensively divides the feature vector space.

The information conversion device 10 selects the feature vector that has the smallest generalized average of distances from the sample set as the reference vector, although the selection of the reference vector is not limited to the manner described above. That is, the information processing device 10 may select the feature vector having the generalized average of distance from the sample set of a predetermined value for a data set for learning having a certain property.

(4) Selection of Feature Vector

The information conversion device 10 described above can select an arbitrary number of pairs of positive examples and pairs of negative examples including a feature vector. The information conversion device 10 obtains a data set including three or more feature vectors from the learning data storage unit 11. The information conversion device 10 may produce a pair of positive examples and a pair of negative examples from the obtained data set and calculate the value of evaluation function using a pair of positive examples and a pair of negative examples that are produced.

The information conversion device 10 described above may reselect a pair of positive examples and a pair of negative examples each time when evaluating a hyperplane.

(5) Embodiments

The information conversion device 10 described above is independent of the information search device 20. This independence is not limited to the exemplary embodiment. For example, the information search device 20 may have the function of the information conversion device 10. The information conversion device 10 may have the function executed by the binary conversion unit 23 of the information search device 20 to produce a conversion matrix and execute the processing of producing a binary string from a feature vector stored in the information search device 20 in operation using the produced conversion matrix. The function of the information conversion device 10 may be executed by a so-called cloud system.

(6) Weighting

The information conversion device 10 selects the reference vector according to the generalized average of distances with weighting. Weighting is not always requested of the exemplary embodiment. For example, the information conversion device 10 is not limited to use weighting in the calculation. The information conversion device 10 can use any weighting method. For example, the information conversion device 10 may request an external input parameter for weighting.

(7) Program

Figure 13:
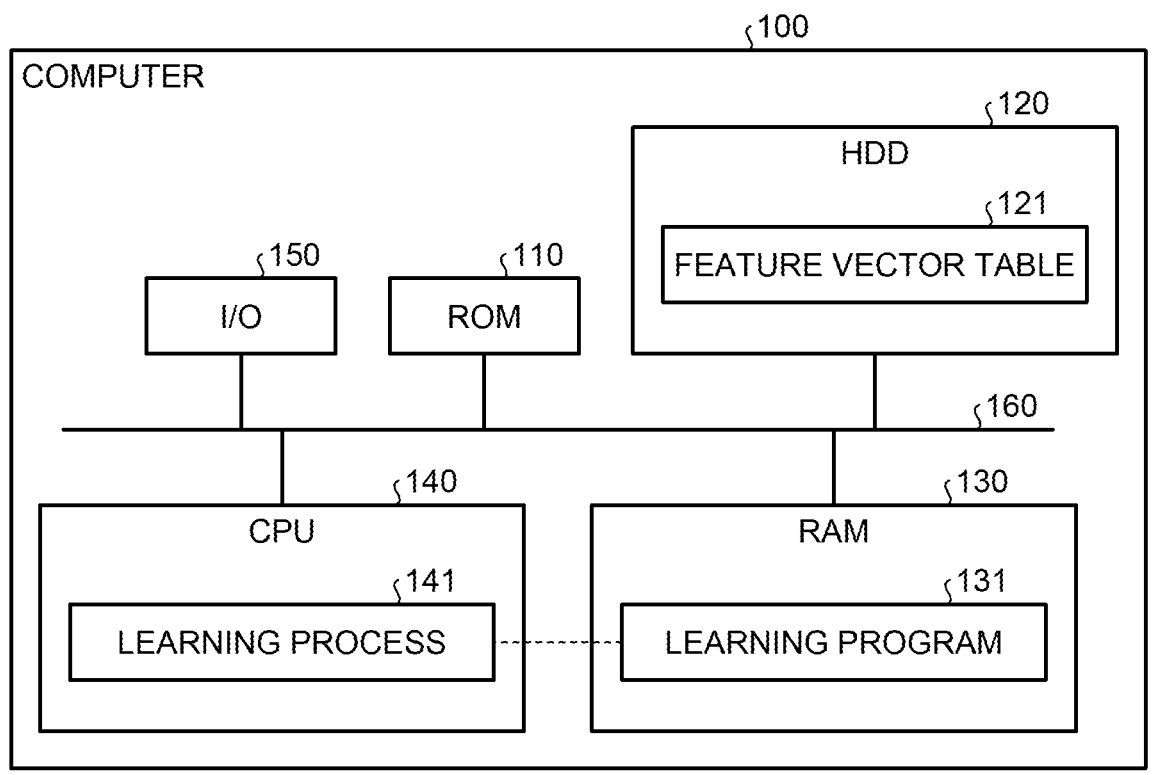
FIG. 13 illustrates an example computer for executing a learning program.

In the first exemplary embodiment, the information conversion device 10 executing various processing using hardware is described. The execution of processing by the exemplary embodiment is not limited to the manner described above. A previously prepared program may be executed by a computer included in the information conversion device 10. Using FIG. 13, an example computer executing a program having a function similar to that of the information conversion device 10 illustrated in the first exemplary embodiment will now be described. FIG. 13 illustrates an example computer for executing a learning program.

In a computer 100 illustrated in FIG. 13, a ROM (read only memory) 110, an HDD (hard disk drive) 120, a RAM (random access memory) 130, and a CPU (central processing unit) 140 are connected via a bus 160. The computer 100 illustrated in FIG. 13 has an I/O (input output) 150 for transmitting and receiving packets.

The HDD 120 stores a feature vector table 121 containing data similar to the data contained in the learning data storage unit 11. A learning program 131 is previously stored in the RAM 130. In the example illustrated in FIG. 13, the learning program 131 functions as a learning process 141 when the CPU 140 reads the learning program 131 from the RAM 130 and executes the learning program 131. The learning process 141 carries out functions similar to those of the sample set selecting unit 12, the reference vector selecting unit 13, the paired data producing unit 14, and the hyperplane learning unit 15 illustrated in FIG. 1.

The learning program described in the exemplary embodiment can be carried out by executing a previously prepared program in a computer such as a personal computer and a workstation. The program can be distributed through a network such as the Internet. The program is recorded in a computer-readable recording medium such as a hard disk, a flexible disk (FD), a CD-ROM (compact disc read only memory), an MO (magneto optical disc), and a DVD (digital versatile disc). The program can be executed through read-out from a recording medium by a computer.

In one aspect, a hyperplane that classifies data comprehensively can be learned.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A learning method comprising:
   obtaining a feature vector derived from biological data from a client device;
   randomly selecting one or more feature vectors from feature vectors for learning to form a sample set, by a processor;
   selecting, from the feature vectors for learning, one of feature vectors appended with a label different from a label appended to a feature vector included in the sample set as a reference vector, the selecting being carried out based on a generalized average of distance from a feature vector included in the sample set, by the processor, the label representing similarity among the feature vectors;
   producing a pair of positive examples composed of one of feature vectors for learning, appended with the same label as the reference vector and including a shortest distance from the reference vector, and the reference vector, by the processor;
   producing a pair of negative examples composed of one of feature vectors for learning, appended with a label different from a label appended to the reference vector and including a shortest distance from the reference vector, and the reference vector, by the processor; and
   learning a hyperplane that divides a feature vector space, the learning includes:
   repeating calculating an evaluation value a plurality of times by changing a location of the hyperplane, the evaluation value being sum of number of pairs of positive examples that are not separated to different regions by the hyperplane and number of pairs of negative examples separated to different regions by the hyperplane as an evaluation value, by the processor;
   determining the hyperplane with the highest evaluation value among the calculated evaluation values, by the processor.

2. The learning method according to claim 1, wherein
   among the feature vectors for learning, a distance from each feature vector included in the sample set is calculated for a feature vector appended with a label different from a label appended to a feature vector included in the sample set, by the processor,
   a generalized average with weighting of the calculated distance is calculated, by the processor, and
   a feature vector including a smallest of the calculated generalized average is selected as a reference vector, by the processor.

3. The learning method according to claim 1, wherein
   among the feature vectors for learning, a distance from each feature vector included in the sample set is calculated for a feature vector appended with a label different from a label appended to a feature vector included in the sample set, by the processor,
   a generalized average with weighting of the calculated distance is calculated, by the processor, and
   a feature vector including the calculated generalized average of a predetermined percentile is selected as a reference vector, by the processor.

4. The learning method according to claim 1, wherein
   among the feature vectors for learning, a distance from each feature vector included in the sample set is calculated for a feature vector not included in the sample set, by the processor,
   an arithmetic average with weighting of the calculated distance is calculated in which plus and minus of the calculated distance between feature vectors appended with a same label is inverted, by the processor, and
   a feature vector including a smallest of the calculated generalized average is determined as a reference vector, by the processor.

5. The learning method according to claim 1, wherein
   among the feature vectors for learning, a distance from each feature vector included in the sample set is calculated for a feature vector not included in the sample set, by the processor,
   an arithmetic average with weighting of the calculated distance is calculated in which plus and minus of the calculated distance between feature vectors appended with a same label is inverted, by the processor, and
   a feature vector including the calculated generalized average of a predetermined percentile is determined as a reference vector, by the processor.

6. An information processing device comprising:
   a processor configured to execute a process including:
   obtaining a feature vector derived from biological data from a client device;
   randomly selecting one or more feature vectors from feature vectors for learning to form a sample set;
   selecting, from the feature vectors for learning, one of feature vectors appended with a label different from a label appended to a feature vector included in the sample set selected at the randomly selecting as a reference vector, the selecting being carried out based on a generalized average of distance from a feature vector included in the sample set, the label representing similarity among the feature vectors;

producing a pair of positive examples composed of one of feature vectors for learning, appended with the same label as the reference vector and including a shortest distance from the reference vector, and the reference vector;

producing a pair of negative examples composed of one of feature vectors for learning, appended with a label different from a label appended to the reference vector and including a shortest distance from the reference vector, and the reference vector; and learning a hyperplane that divides a feature vector space, the learning includes:

repeating calculating an evaluation value a plurality of times by changing a location of the hyperplane, the evaluation value being sum of number of pairs of positive examples that are not separated to different regions by the hyperplane and number of pairs of negative examples separated to different regions by the hyperplane as an evaluation value, by the processor;

determining the hyperplane with the highest evaluation value among the calculated evaluation values.

7. A non-transitory computer-readable recording medium storing a learning program that causes a computer to execute a process comprising:

obtaining a feature vector derived from biological data from a client device;

randomly selecting one or more feature vectors from feature vectors for learning to form a sample set;

selecting, from the feature vectors for learning, one of feature vectors appended with a label different from a label appended to a feature vector included in the sample set as a reference vector, the selecting being carried out based on a generalized average of distance from a feature vector included in the sample set, the label representing similarity among the feature vectors;

producing a pair of positive examples composed of one of feature vectors for learning, appended with the same label as the reference vector and including a shortest distance from the reference vector, and the reference vector;

producing a pair of negative examples composed of one of feature vectors for learning, appended with a label different from a label appended to the reference vector and including a shortest distance from the reference vector, and the reference vector; and learning a hyperplane that divides a feature vector space, the learning includes:

repeating calculating an evaluation value a plurality of times by changing a location of the hyperplane, the evaluation value being sum of number of pairs of positive examples that are not separated to different regions by the hyperplane and number of pairs of negative examples separated to different regions by the hyperplane as an evaluation value, by the processor;

determining the hyperplane with the highest evaluation value among the calculated evaluation values.

\* \* \* \* \*